United States Patent
Ryu et al.

(10) Patent No.: US 10,004,050 B2
(45) Date of Patent: Jun. 19, 2018

(54) METHOD AND APPARATUS FOR SYNCHRONIZING AND PROPAGATING STATE INFORMATION IN WIRELESS DOWNLINK/UPLINK

(71) Applicant: QUALCOMM Incorporated, San Diego, CA (US)

(72) Inventors: Jung H. Ryu, Somerville, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 87 days.

(21) Appl. No.: 14/285,499

(22) Filed: May 22, 2014

(65) Prior Publication Data

US 2015/0341872 A1    Nov. 26, 2015

(51) Int. Cl.
| | |
|---|---|
| *H04W 4/00* | (2018.01) |
| *H04W 56/00* | (2009.01) |
| *H04L 12/26* | (2006.01) |
| *H04B 7/0404* | (2017.01) |
| *H04B 7/0408* | (2017.01) |
| *H04B 7/08* | (2006.01) |

(52) U.S. Cl.
CPC ........ *H04W 56/001* (2013.01); *H04B 7/0404* (2013.01); *H04B 7/0408* (2013.01); *H04B 7/0834* (2013.01); *H04L 43/04* (2013.01); *H04W 56/0075* (2013.01)

(58) Field of Classification Search
CPC .................................. H04B 1/38; H04W 4/00
USPC .......... 370/280–339; 455/412, 422, 446, 561
See application file for complete search history.

(56) References Cited

U.S. PATENT DOCUMENTS

| | | | |
|---|---|---|---|
| 8,374,163 | B2 | 2/2013 | Horn et al. |
| 8,626,214 | B2 | 1/2014 | Cheng et al. |
| 2010/0118837 | A1 | 5/2010 | Bracha |
| 2010/0226304 | A1* | 9/2010 | Shoji .................. H04B 1/40 370/315 |
| 2011/0158164 | A1 | 6/2011 | Palanki et al. |
| 2011/0243040 | A1* | 10/2011 | Khan .................. H04B 7/0617 370/280 |
| 2012/0178482 | A1 | 7/2012 | Seo et al. |
| 2012/0208552 | A1 | 8/2012 | Siomina et al. |
| 2013/0088983 | A1* | 4/2013 | Pragada ................ H04W 16/14 370/252 |

(Continued)

FOREIGN PATENT DOCUMENTS

WO    2013048079 A1    4/2013

OTHER PUBLICATIONS

International Search Report and Written Opinion—PCT/US2015/028906—ISA/EPO—dated Aug. 11, 2015.

*Primary Examiner* — Iqbal Zaidi
(74) *Attorney, Agent, or Firm* — Clint R. Morin; Arent Fox, LLP

(57) ABSTRACT

A method, an apparatus, and a computer program product for operating a user equipment (UE) are provided. The apparatus receives first information from a first millimeter-wave base station (mwB), determines second information based on the received first information, and transmits the second information to at least one other mwB. The first information and the second information are related to synchronization and/or a network state between the first mwB and the at least one other mwB.

22 Claims, 12 Drawing Sheets

(56) References Cited

U.S. PATENT DOCUMENTS

2015/0230263 A1\* 8/2015 Roy .................. H04W 36/0083
455/452.2

\* cited by examiner

METHOD AND APPARATUS FOR SYNCHRONIZING AND PROPAGATING STATE INFORMATION IN WIRELESS DOWNLINK/UPLINK

BACKGROUND

Field

The present disclosure relates generally to communication systems, and more particularly, to utilizing a user equipment (UE) to synchronize and/or share control information between two millimeter-wave base stations (mwBs) in a wireless millimeter-wave network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives first information from a first millimeter-wave base station (mwB), determines second information based on the received first information, and transmits the second information to at least one other mwB. The first information and the second information are related to synchronization and/or a network state between the first mwB and the at least one other mwB.

DETAILED DESCRIPTION

Figure 1:
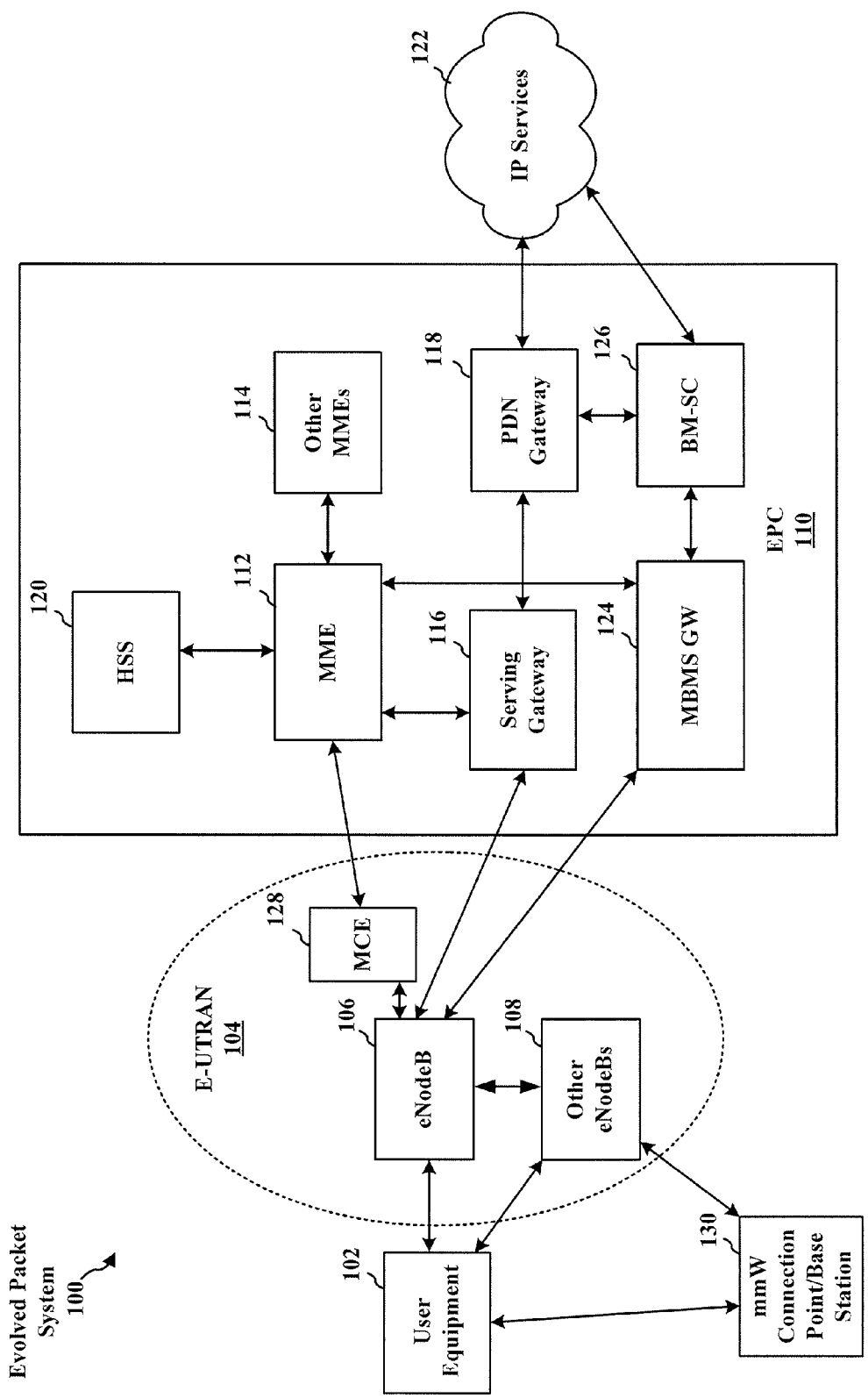
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link.

Figure 2:
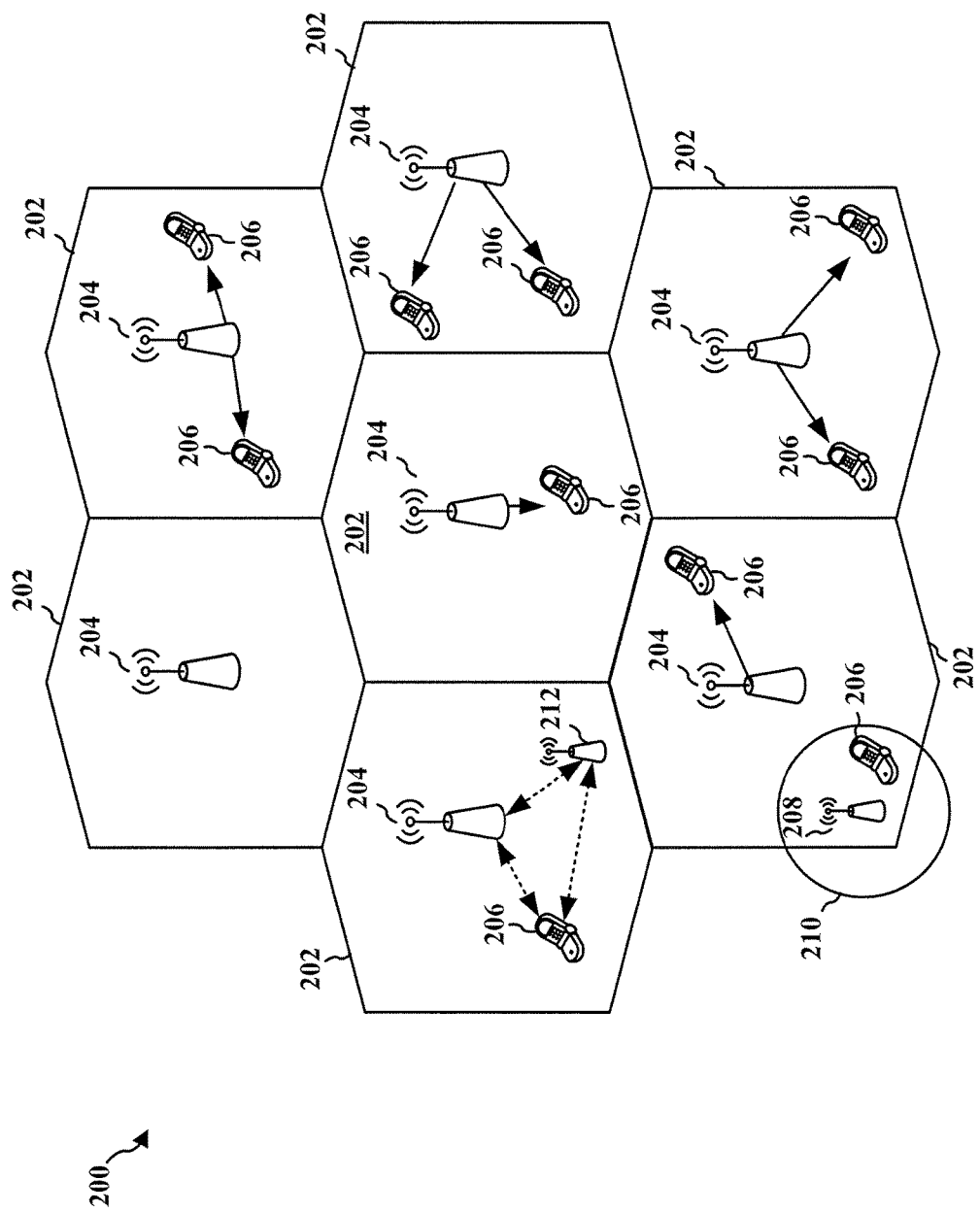
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
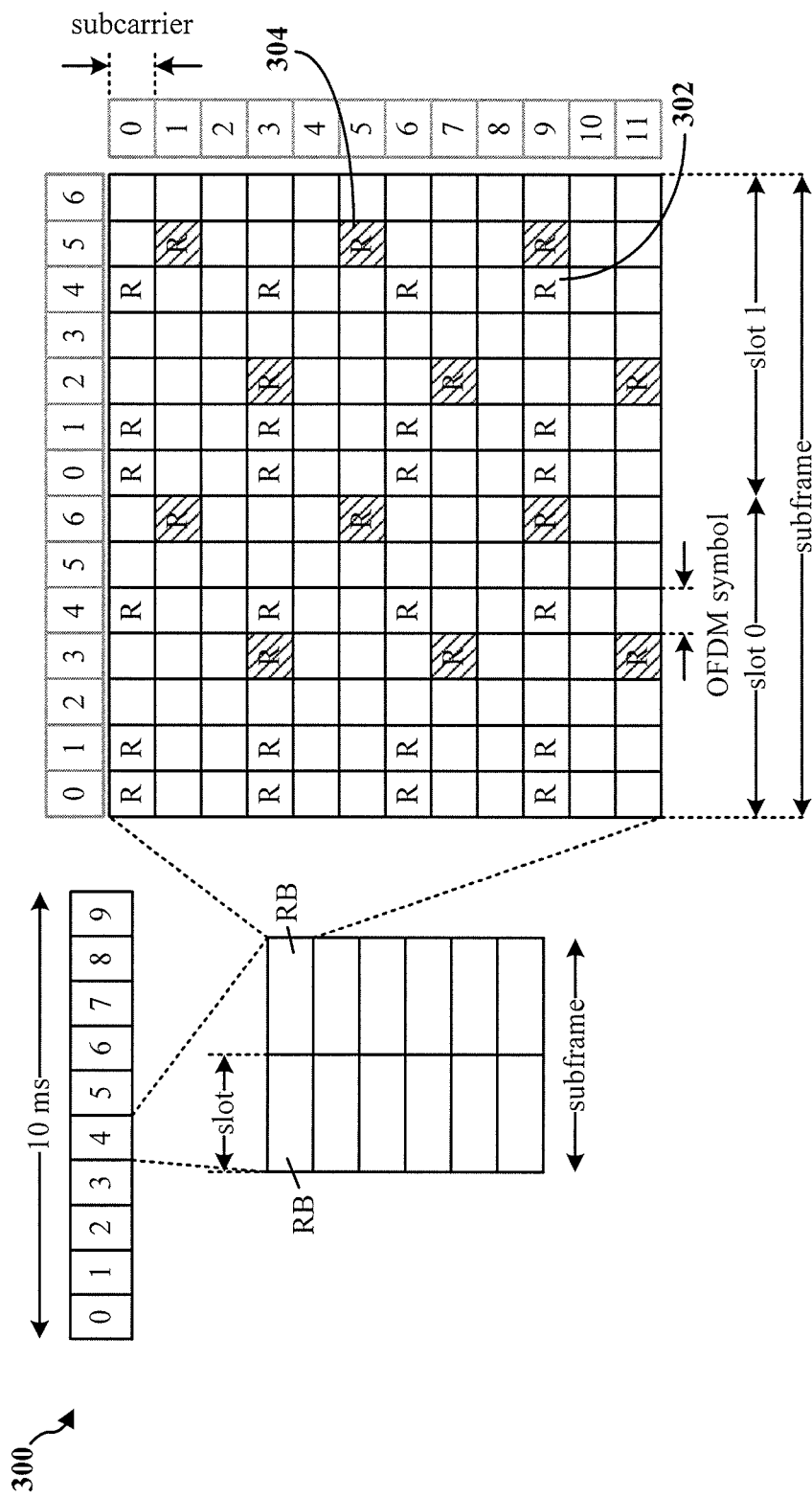
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
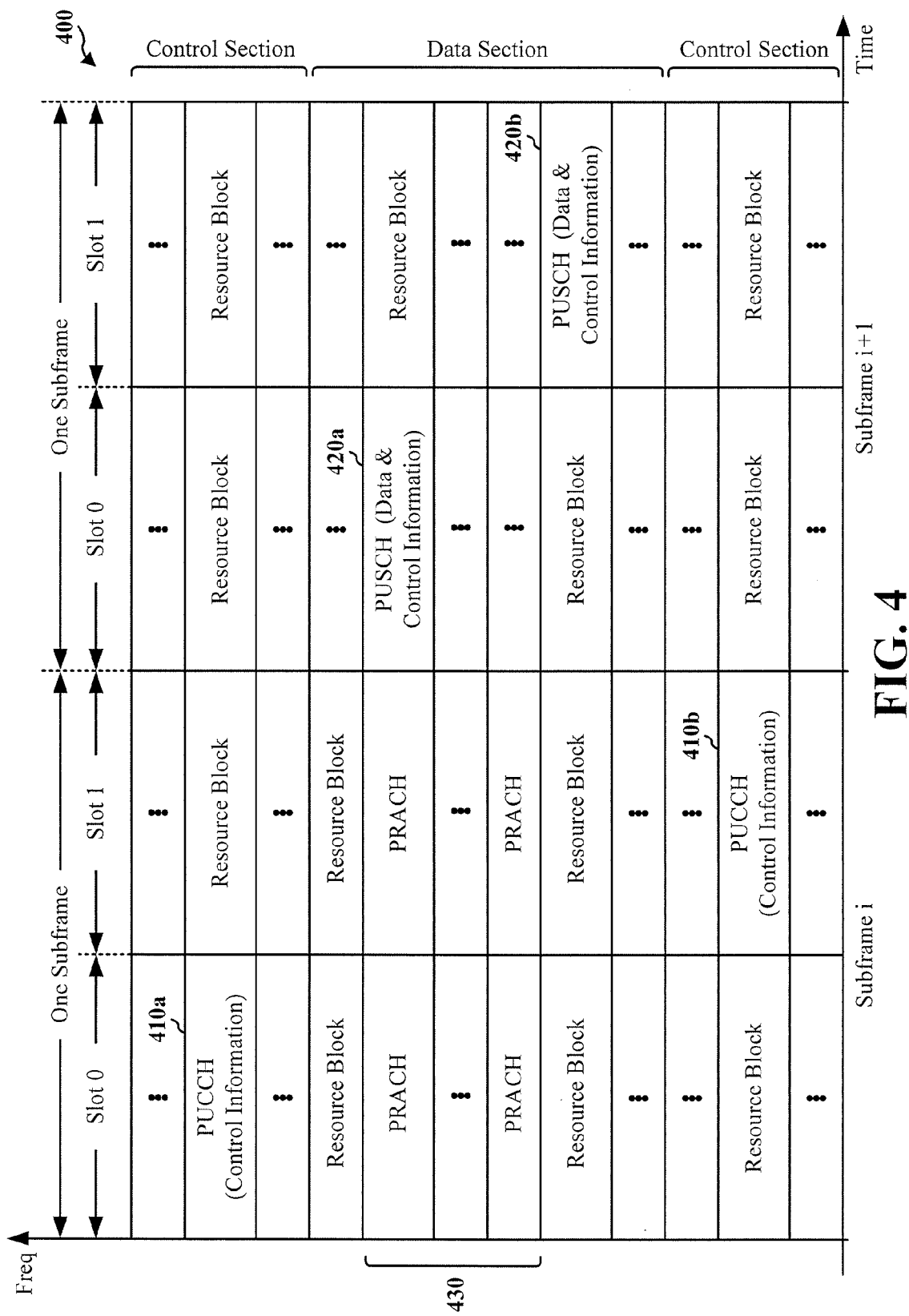
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
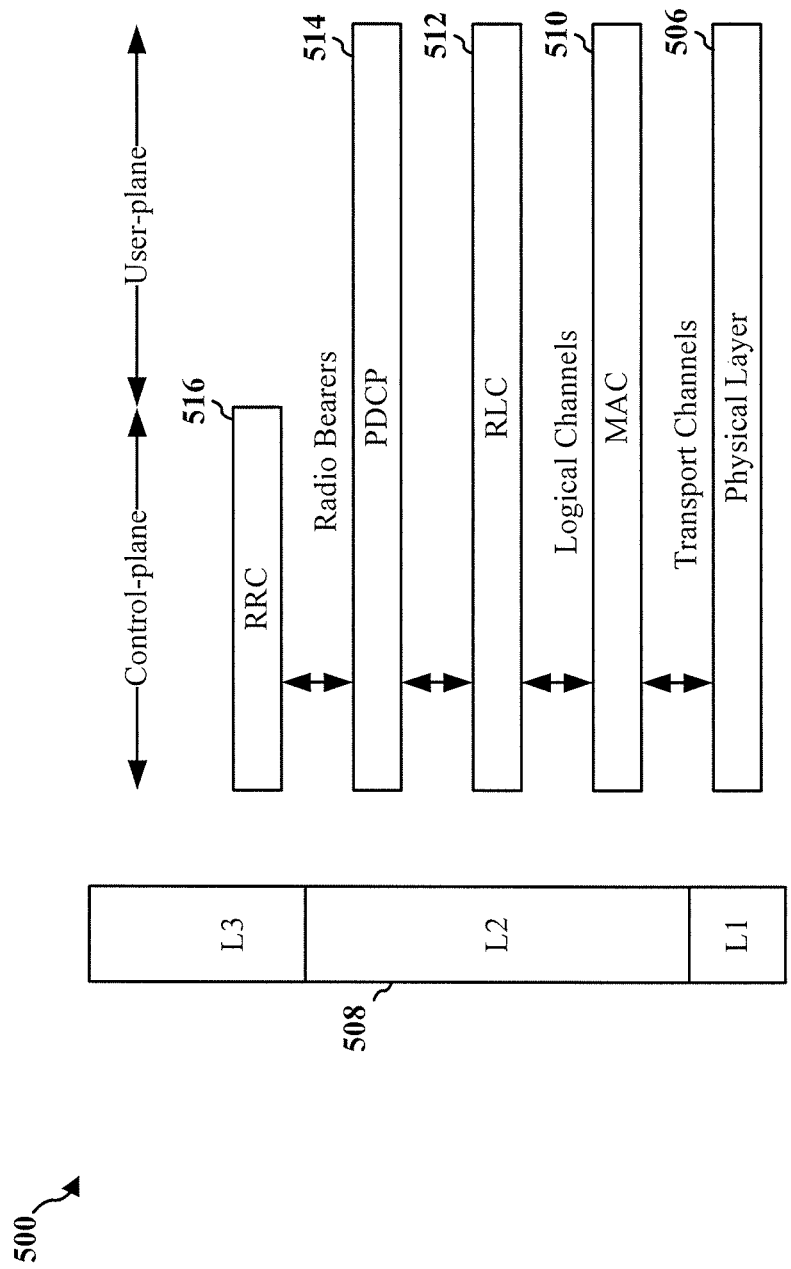
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
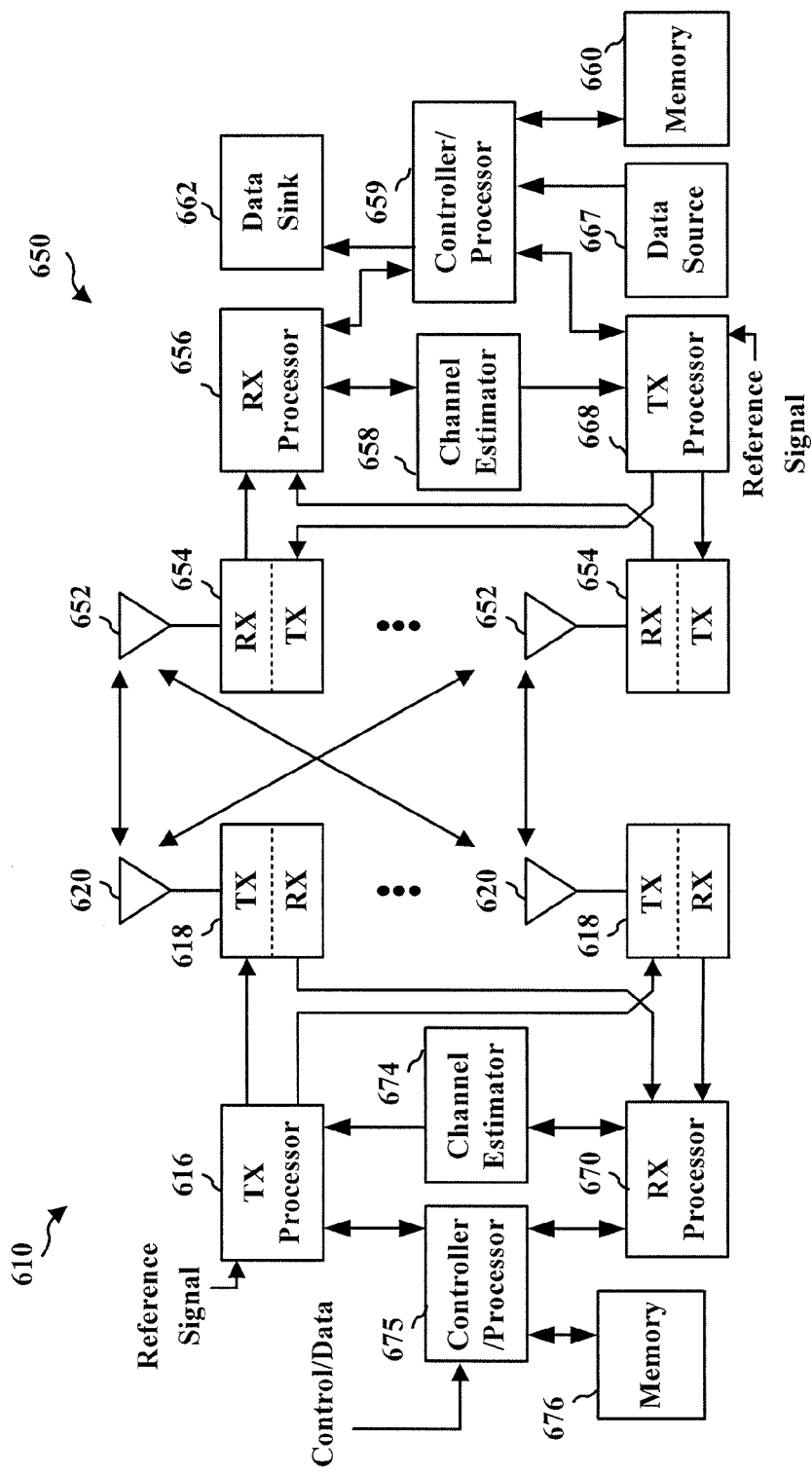
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
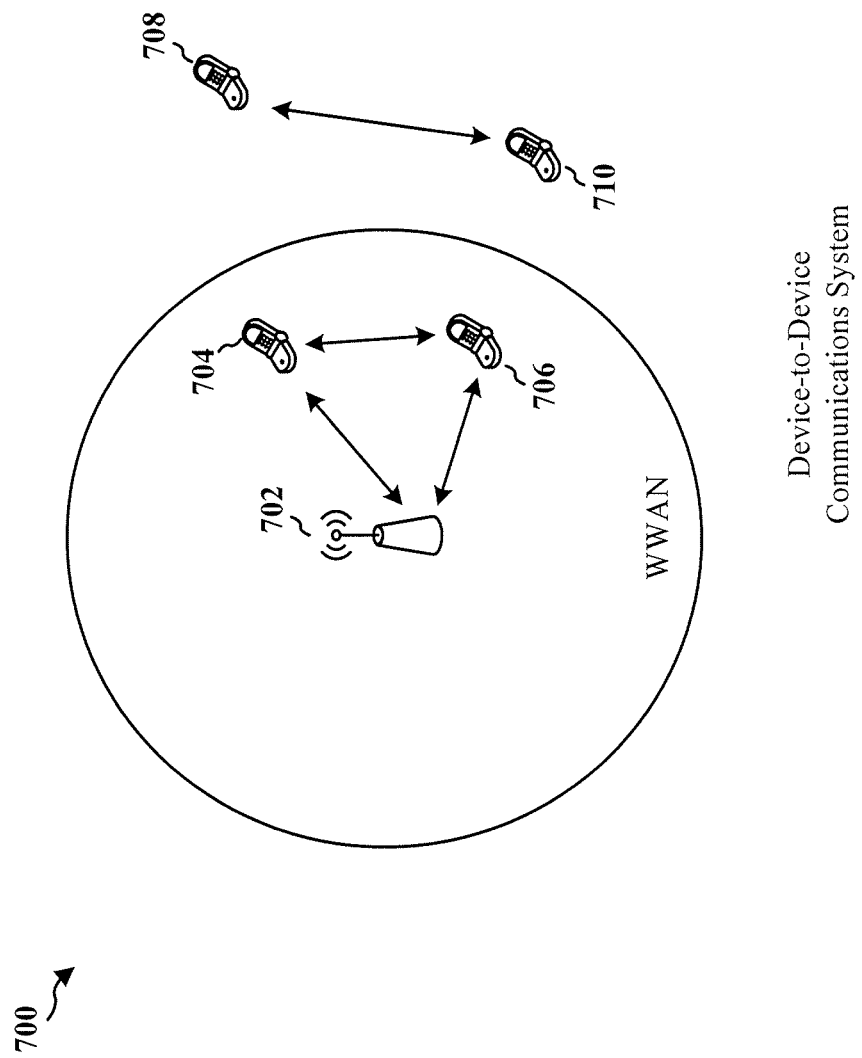
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling for discovery, synchronization, or association on a mmW channel that can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 8A:
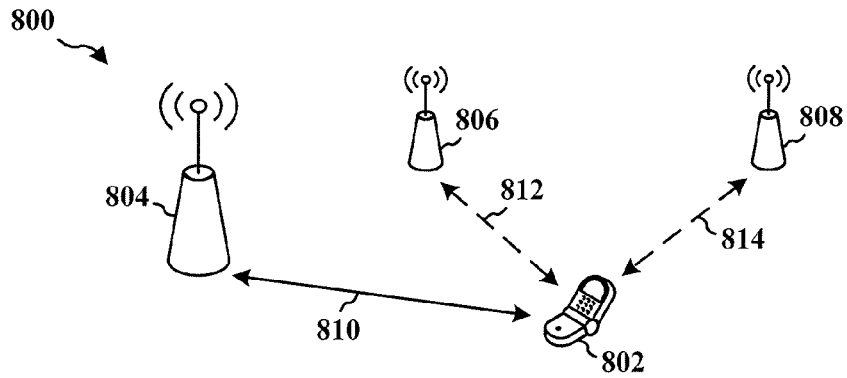
FIGS. 8A to 8C are diagrams illustrating example deployments of a mmW system used in conjunction with a LTE system.
Figure 8B:
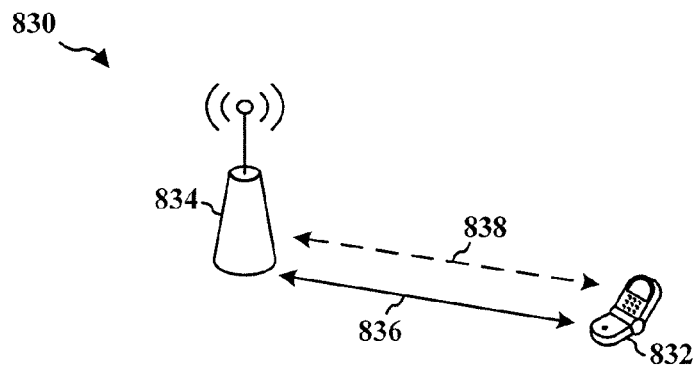
Figure 8C:
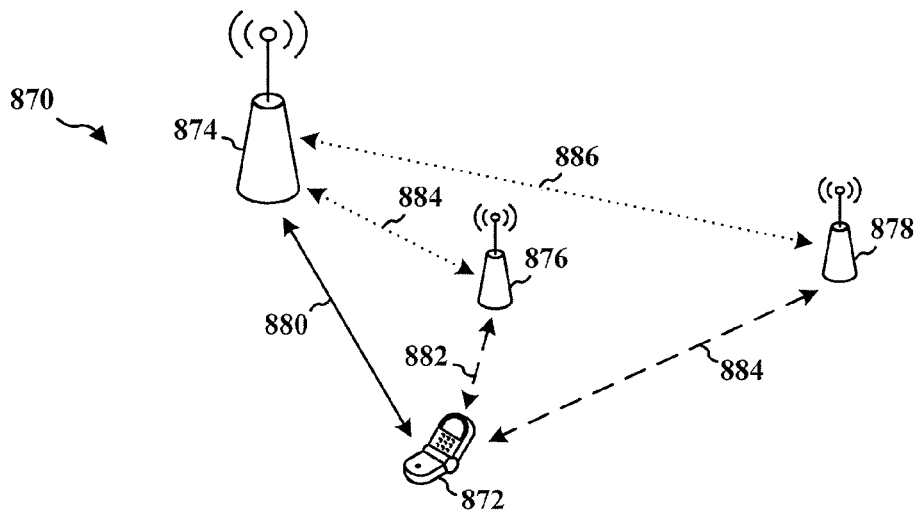

FIGS. 8A to 8C are diagrams illustrating example deployments of a mmW system used in conjunction with a LTE system. In FIG. 8A, diagram 800 illustrates a deployment where a LTE system operates independently of, and in parallel with, a mmW system. As shown in FIG. 8A, a UE 802 is capable of communicating signals via a LTE system and a mmW system. Accordingly, the UE 802 may communicate with a eNB 804 over a LTE link 810. In parallel with the LTE link 810, the UE 802 may also communicate with a first BS 806 over a first mmW link 812 and communicate with a second BS 808 over a second mmW link 814.

In FIG. 8B, diagram 830 illustrates a deployment where the LTE system and the mmW system are collocated. As shown in FIG. 8B, a UE 832 is capable of communicating signals via the LTE system and the mmW system. In an aspect, a BS 834 may be an LTE eNB capable of communicating signals via the LTE system and the mmW system. As such, the BS 834 may be referred to as a LTE+mmW eNB. In another aspect, the BS 834 may be a mmW CP capable of communicating signals via the LTE system and the mmW system. As such, the BS 834 may be referred to as a LTE+mmW BS. The UE 832 may communicate with the BS 834 over a LTE link 836. Meanwhile, the UE 832 may also communicate with the BS 834 over a mmW link 838.

In FIG. 8C, diagram 870 illustrates a deployment where a BS capable of communicating signals via the LTE system and the mmW system (LTE+mmW base station) is present with BSs capable of communicating signals via the mmW system only. As shown in FIG. 8C, a UE 872 may communicate with a LTE+mmW BS 874 over a LTE link 880. The LTE+mmW BS 874 may be a LTE+mmW eNB. In parallel with the LTE link 880, the UE 872 may also communicate with a second BS 876 over a first mmW link 882 and communicate with a third BS 878 over a second mmW link 884. The second BS 876 may further communicate with the LTE+mmW BS 874 over a first mmW backhaul link 884. The third BS 878 may further communicate with the LTE+mmW BS 874 over a second mmW backhaul link 886.

In an aspect, synchronization of mmW BSs (mwBs) and propagation of network state information between relevant mwBs in a network is key for optimal operation of the network. Synchronization between mwBs is desired to reduce transmission interference and/or reception interference with respect to time, frequency, and space. Synchronization between mwBs also increases efficiency and saves resources. For example, if two unsynchronized mwBs transmit at the same time in the same frequency bandwidth, then the two transmissions may interfere with each other resulting in neither transmission being properly received, hence wasting the resources used for both transmissions.

Synchronization information as well as other types of information regarding a state and operation of the network may be shared among nearby mwBs in order to improve overall system performance. Examples of network state information may include wireless link availability or global time information. Overall schedules and inter-BS interference reports may also be shared between mwBs.

In an aspect, because mwBs operate at a high bandwidth and high data rate, a timing synchronization between mwBs should be very accurate (e.g., less than one microsecond). Accurate timing between mwBs may be obtained by using a GPS signal. The GPS signal may provide very precise timing across a number of mwBs. However, for a mmW access network deployed in an urban area, not all mwBs may be able to acquire the GPS signal such as when the signal from a GPS satellite is blocked by a building or other structure. To resolve this issue, an mwB with a clear view of the GPS satellite may acquire the GPS signal and be the source of timing information for other mwBs. The timing information may be propagated over a mmW backhaul network (i.e., propagated over mwB-to-mwB wireless links).

Performance of a mwB-to-mwB wireless link may highly depend on a line-of-sight (LOS) between two mwBs. However, a LOS link may become blocked by unanticipated obstructions, for example, a tree growing between two lamp posts on which the mwBs are mounted. As an alternative, the timing information may be propagated from one mwB to another mwB via a wired connection. However, hard-wiring mwBs in an urban deployment may be highly expensive. In such a case, the timing information may be relayed through a UE that is connected to the mwBs desiring a synchronized timing with each other. The UE may also be used to relay network state information and control information between the mwBs.

Figure 9:
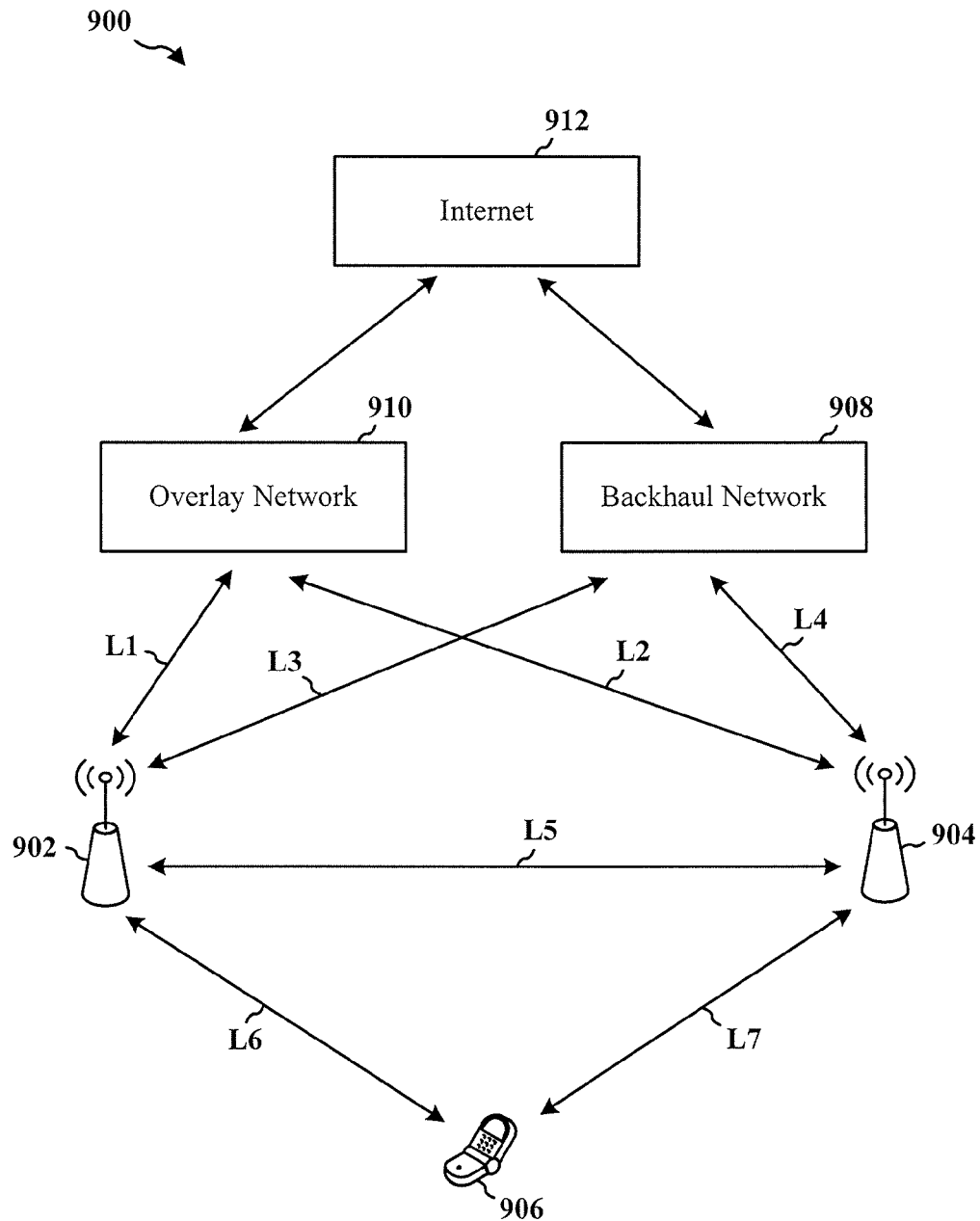
FIG. 9 is diagram illustrating a wireless network communicating a radio signal with high propagation attenuation and a short carrier wavelength

FIG. 9 is diagram 900 illustrating a wireless network communicating a radio signal with high propagation attenuation and a short carrier wavelength. To overcome the high propagation attenuation, the wireless network may allow for the radio signal to be focused and directed in certain directions via beamforming However, a radio link between two mwBs may become unavailable due to severe propagation loss and/or configuration geometry. Such conditions pose a challenge to synchronization and propagation of timing information and network state information in wireless downlink/uplink networks.

Typically, when the radio link between two mwBs is unavailable, a backhaul network between the mwBs may be used to synchronize and share information. Alternatively, an overlay network (e.g., LTE network) in which the mwBs have direct links with each other may be used. The backhaul network and the overlay network may be connected to the Internet (see 912 in FIG. 9). However, for mmW networks, the backhaul network and/or overlay network may be too slow, may not have sufficient bandwidth, or may not be available at all. Accordingly, the present disclosure provides techniques for communicating control signals (e.g., timing information and resource allocation information) and interference management signals between mwBs using a UE.

Referring to FIG. 9, a first mwB 902 and a second mwB 904 may need to synchronize with each other and share timing information and/or network state information. However, links to an overlay network 910 (e.g., link L1 between the first mwB 902 and the overlay network 910 and link L2 between the second mwB 904 and the overlay network 910) may be unavailable or unreliable. Links to a backhaul network 908 (e.g., link L3 between the first mwB 902 and the backhaul network 908 and link L4 between the second mwB 904 and the backhaul network 908) or a direct link L5 between the first mwB 902 and the second mwB 904 may also be unavailable or unreliable. For example, the direct link L5 may be unavailable due to extreme radio frequency (RF) propagation loss. Accordingly, the first mwB 902 and the second mwB 904 may use a UE 906 as a relay via links L6 and L7. Using the UE 906 as a relay, the first mwB 902 and the second mwB 904 may receive timing information from each other and exchange network resource allocation information.

In aspects of the disclosure, the UE 906 may participate as a relay to facilitate the exchange of synchronization information and/or network state information between two or more mwBs (e.g., first mwB 902 and second mwB 904). In general, an mwB that is connected to a UE may instruct the UE to relay a message (including timing or control information) to a nearby mwB.

In an aspect, the UE 906 may track beamforming directions and beamforming schedules/transmission schedules of an mwB, including mwBs to which the UE 906 is not connected. The UE 906 may transmit information (e.g., via a broadcast channel) in a direction toward the mwBs that are not currently connected with the UE 906.

In an aspect, the UE 906 may receive timing information from mwBs in a vicinity of the UE 906. The UE 906 may measure a discrepancy (difference) between the timing information received from a respective mwB and an expected timing information. The UE 906 may also measure a timing discrepancy (difference) between multiple mwBs. The UE 906 may transmit the measured timing discrepancies to the mwBs. A mwB may adjust a timing with respect to another mwB based on the measurements. Consequently, synchronization among the mwBs is improved.

In an aspect, mwBs coordinate with each other to minimize transmission in the same frequency band. For example, the UE 906 that has an established link to the first mwB 902 may relay spectrum occupancy information (resource allocation information) of the first mwB 902 to the second mwB 904, and vice versa. In particular, the spectrum occupancy information can be relayed during an acknowledge portion of mwB discovery or during beam searching/tracking.

In an aspect, although the UE 906 may have an established link with a particular mwB (e.g., first mwB 902), the UE 906 may receive an interfering signal from another mwB that is trying to connect to a different UE. The UE 906 whose reception is being interfered with may transmit the spectrum occupancy information of the particular mwB (e.g., first mwB 902) to the interfering mwB, at which point the interfering mwB is prompted, based on the spectrum occupancy information, to select a different frequency band, different transmit/receive beam directions, or a different time slot to connect to the different UE.

In an aspect, a transmission from a mwB may interfere with reception at another mwB (e.g., first mwB 902). In this case, the first mwB 902 whose reception is being interfered with may transmit spectrum occupancy information to the UE 906 to which it is connected along with an instruction to forward the spectrum occupancy information to the interfering mwB. The UE 906 will then send the spectrum occupancy information of the first mwB 902 to the interfering mwB based on the instruction. Thereafter, based on the received spectrum occupancy information of the first mwB 902, the interfering mwB is prompted to select a different frequency band, different transmit/receive beam directions, or a different time slot to transmit a signal.

Figure 10:
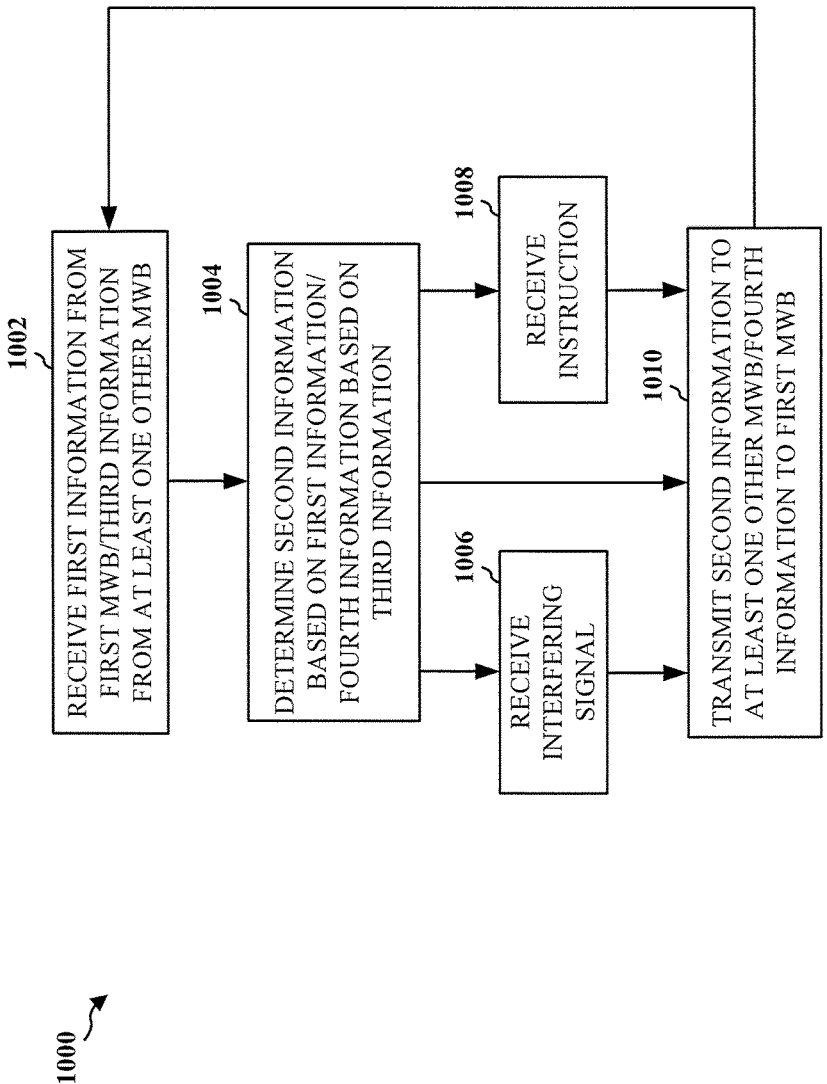
FIG. 10 is a flow chart of a method of wireless communication

FIG. 10 is a flow chart 1000 of a method of operating a user equipment (UE).

The method may be performed by a UE (e.g., the UE 906). At step 1002, the UE receives first information from a first millimeter-wave base station (mwB). At step 1004, the UE determines second information based on the received first information.

At step 1010, the UE transmits the second information to at least one other mwB. The first information and the second information may be related to synchronization and/or a network state between the first mwB and the at least one other mwB.

In an aspect, the first information may include timing information of the first mwB. Accordingly, at step 1004, the UE determines the second information by measuring a first timing discrepancy between the timing information of the first mwB and an expected timing information. Additionally or alternatively, the UE may determine the second information by measuring a second timing discrepancy between the timing information of the first mwB and timing information of the at least one other mwB. As such, at step 1010, the UE transmits the second information by transmitting the measured first timing discrepancy and/or the measured second timing discrepancy to the at least one other mwB.

In an aspect, the first information may include resource allocation information of the first mwB. Accordingly, at step 1004, the UE determines the second information to be the first information. Moreover, at step 1010, the UE transmits the second information by transmitting the resource allocation information of the first mwB to the at least one other mwB. The resource allocation information of the first mwB may be transmitted during mwB discovery.

In a further aspect, after the UE determines the second information (step 1004), at step 1006, the UE may receive an interfering signal from the at least one other mwB. Accordingly, at step 1010, UE transmits the resource allocation information of the first mwB to the at least one other mwB when the interfering signal is received.

In yet another aspect, the first mwB may receive interference from the at least one other mwB. Based on the interference received by the first mwB, the first mwB may send an instruction to the UE for sending to the at least one other mwB information related to the first mwB. For example, after the UE determines the second information (step 1004), at step 1008, the UE may receive an instruction from the first mwB to transmit the resource allocation information of the first mwB to the at least one other mwB. Accordingly, at step 1010, the UE transmits the resource allocation information of the first mwB to the at least one other mwB based on the instruction.

The UE operation may then proceed back to step 1002, wherein the UE receives third information from the at least one other mwB. Thereafter, at step 1004, the UE determines fourth information based on the received third information, and at step 1010, the UE transmits the fourth information to the first mwB.

In an aspect, the third information may include timing information of the at least one other mwB. Accordingly, at step 1004, the UE determines the fourth information by measuring a first timing discrepancy between the timing information of the at least one other mwB and an expected timing information. Additionally or alternatively, the UE determines the fourth information by measuring a second timing discrepancy between the timing information of the at least one other mwB and timing information of the first mwB. As such at step 1010, the UE transmits the fourth information by transmitting the measured first timing discrepancy and/or the measured second timing discrepancy to the first mwB.

In another aspect, the third information may include resource allocation information of the at least one other mwB. Accordingly, at step 1004, the UE determines the fourth information to be the third information. Moreover, at step 1010, the UE transmits the fourth information by transmitting the resource allocation information of the at least one other mwB to the first mwB.

Figure 11:
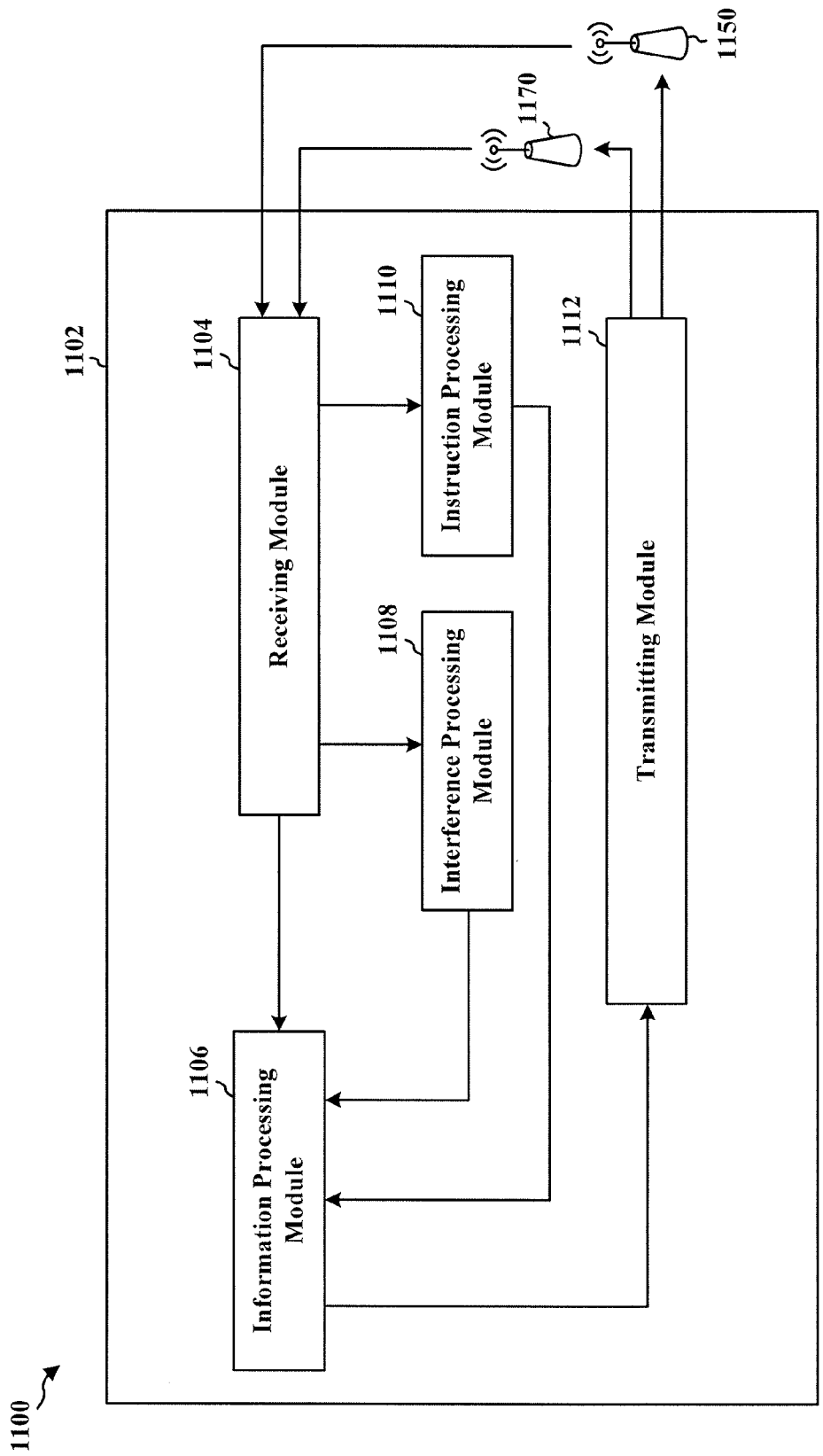
FIG. 11 is a data flow diagram illustrating the data flow between different modules/means/components in an exemplary apparatus.

FIG. 11 is a data flow diagram 1100 illustrating the data flow between different modules/means/components in an exemplary apparatus 1102. The apparatus may be a UE (e.g., UE 906). The apparatus includes a receiving module 1104, an information processing module 1106, an interference processing module 1108, an instruction processing module 1110, and a transmitting module 1112.

The information processing module 1106 receives (via the receiving module 1104) first information from a first mwB 1150. The information processing module 1106 determines second information based on the received first information.

The information processing module 1106 transmits (via the transmitting module 1112) the second information to at least one other mwB 1170. The first information and the second information may be related to synchronization and/or a network state between the first mwB 1150 and the at least one other mwB 1170.

In an aspect, the first information may include timing information of the first mwB 1150. Accordingly, the information processing module 1106 determines the second information by measuring a first timing discrepancy between the timing information of the first mwB 1150 and an expected timing information. Additionally or alternatively, the information processing module 1106 may determine the second information by measuring a second timing discrepancy between the timing information of the first mwB 1150 and timing information of the at least one other mwB 1170. As such, the information processing module 1106 transmits (via the transmitting module 1112) the second information by transmitting the measured first timing discrepancy and/or the measured second timing discrepancy to the at least one other mwB 1170.

In an aspect, the first information may include resource allocation information of the first mwB 1150. Accordingly, the information processing module 1106 determines the second information to be the first information. Moreover, the information processing module 1106 transmits (via the transmitting module 1112) the second information by transmitting the resource allocation information of the first mwB 1150 to the at least one other mwB 1170. The resource allocation information of the first mwB 1150 may be transmitted during mwB discovery.

In a further aspect, after the information processing module 1106 determines the second information, the interference processing module 1108 may receive (via the receiving module 1104) an interfering signal from the at least one other mwB 1170. Accordingly, the information processing module 1106 transmits (via the transmitting module 1112) the resource allocation information of the first mwB 1150 to the at least one other mwB 1170 when the interfering signal is received.

In yet another aspect, the first mwB 1150 may receive interference from the at least one other mwB 1170. Based on the interference received by the first mwB 1150, the first mwB 1150 may send an instruction to the apparatus 1102 for sending to the at least one other mwB 1170 information related to the first mwB 1150. For example, after the information processing module 1106 determines the second information, the instruction processing module 1110 may receive (via the receiving module 1104) an instruction from the first mwB 1150 to transmit the resource allocation information of the first mwB 1150 to the at least one other mwB 1170. Accordingly, the information processing module 1106 transmits (via the transmitting module) the resource allocation information of the first mwB 1150 to the at least one other mwB 1170 based on the instruction.

The information processing module 1106 may receive (via the receiving module 1104) third information from the at least one other mwB 1170. Thereafter, the information processing module 1106 determines fourth information based on the received third information, and transmits (via the transmitting module 1112) the fourth information to the first mwB 1150.

In an aspect, the third information may include timing information of the at least one other mwB 1170. Accordingly, the information processing module 1106 determines the fourth information by measuring a first timing discrepancy between the timing information of the at least one other mwB 1170 and an expected timing information. Additionally or alternatively, the information processing module 1106 determines the fourth information by measuring a second timing discrepancy between the timing information of the at least one other mwB 1170 and timing information of the first mwB 1150. As such, the information processing module 1106 transmits (via the transmitting module 1112) the fourth information by transmitting the measured first timing discrepancy and/or the measured second timing discrepancy to the first mwB 1150.

In another aspect, the third information may include resource allocation information of the at least one other mwB 1170. Accordingly, the information processing module 1106 determines the fourth information to be the third information. Moreover, the information processing module 1106 transmits (via the transmitting module 1112) the fourth information by transmitting the resource allocation information of the at least one other mwB 1170 to the first mwB 1150.

Figure 12:
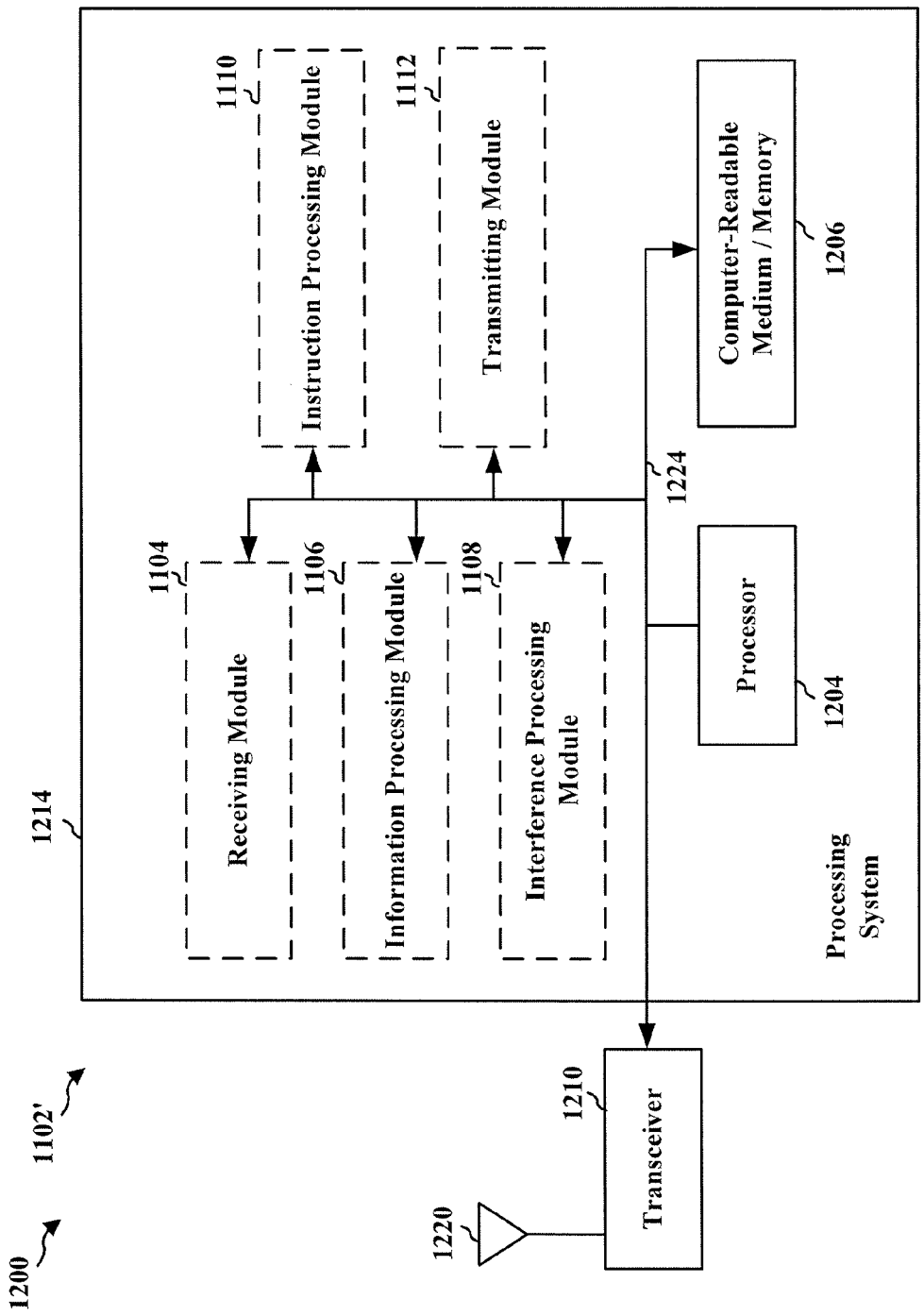
FIG. 12 is a diagram illustrating an example of a hardware implementation for an apparatus employing a processing system.

The apparatus may include additional modules that perform each of the steps illustrated in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmitting module 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for receiving first information from a first millimeter-wave base station (mwB), means for determining second information based on the received first information, means for transmitting the second information to at least one other mwB, wherein the first information and the second information are related to at least one of synchronization or a network state between the first mwB and the at least one other mwB, means for receiving an interfering signal from the at least one other mwB, wherein the resource allocation information of the first mwB is transmitted to the at least one other mwB when the interfering signal is received, means for receiving an instruction from the first mwB to transmit the resource allocation information of the first mwB to the at least one other mwB, wherein the resource allocation information of the first mwB is transmitted to the at least one other mwB based on the instruction, means for receiving third information from the at least one other mwB, means for determining fourth information based on the received third information, and means for transmitting the fourth information to the first mwB.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE), comprising:
    receiving at the UE first information from a first millimeter-wave base station (mwB), wherein the first information comprises resource allocation information of the first mwB;
    determining second information based on the received first information; and
    transmitting from the UE the second information to at least one other mwB during discovery of the at least one other mwB, or in association with one of a received interfering signal, or a received instruction, with the UE being a relay between the first mwB and the at least one other mwB,
    wherein the first information and the second information are related to at least one of synchronization or a network state between the first mwB and the at least one other mwB, wherein the second information comprises the resource allocation information of the first mwB.

2. The method of claim 1, wherein the first information comprises timing information of the first mwB;
    the determining the second information comprises measuring at least one of:
        a first timing discrepancy between the timing information of the first mwB and an expected timing information, or a second timing discrepancy between the timing information of the first mwB and timing information of the at least one other mwB; and the transmitting the second information comprises transmitting the at least one of the measured first timing discrepancy or the measured second timing discrepancy to the at least one other mwB.

3. The method of claim 1, further comprising: receiving the interfering signal from the at least one other mwB, wherein the resource allocation information of the first mwB is transmitted to the at least one other mwB when the interfering signal is received.

4. The method of claim 1, wherein the first mwB receives interference from the at least one other mwB, the method further comprising:

receiving the instruction from the first mwB to transmit the resource allocation information of the first mwB to the at least one other mwB, wherein the resource allocation information of the first mwB is transmitted to the at least one other mwB based on the received instruction.

5. The method of claim 1, further comprising: receiving third information from the at least one other mwB; determining fourth information based on the received third information; and transmitting the fourth information to the first mwB.

6. The method of claim 5, wherein:

the third information comprises timing information of the at least one other mwB; the determining the fourth information comprises measuring at least one of:

a first timing discrepancy between the timing information of the at least one other mwB and an expected timing information, or a second timing discrepancy between the timing information of the at least one other mwB and timing information of the first mwB; and the transmitting the fourth information comprises transmitting the at least one of the measured first timing discrepancy or the measured second timing discrepancy to the first mwB.

7. The method of claim 5, wherein:

the third information comprises resource avocation information of the at least one other mwB;

the fourth information is determined to be the third information; and the transmitting the fourth information comprises transmitting the resource allocation information of the at least one other mwB to the first mwB.

8. A user equipment (UE), comprising at least one processor coupled to a memory and configured to provide:

means for receiving first information from a first millimeter-wave base station (mwB), wherein the first information comprises resource allocation information of the first mwB;

means for determining second information based on the received first information; and means for transmitting the second information to at least one other mwB during discovery of the at least one other mwB, or in association with one of a received interfering signal, or a received instruction, with the UE being a relay between the first mwB and the at least one other mwB, wherein the first information and the second information are related to at least one of synchronization or a network state between the first mwB and the at least one other mwB, wherein the second information comprises resource allocation information of the first mwB.

9. The UE of claim 8, wherein:

the first information comprises timing information of the first mwB; the means for determining the second information is configured to measure at least one of:

a first timing discrepancy between the timing information of the first mwB and an expected timing information, or a second timing discrepancy between the timing information of the first mwB and timing information of the at least one other mwB; and the means for transmitting the second information is configured to transmit the at least one of the measured first timing discrepancy or the measured second timing discrepancy to the at least one other mwB.

10. The UE of claim 8, further comprising:

means for receiving the interfering signal from the at least one other mwB, wherein the resource allocation information of the first mwB is transmitted to the at least one other mwB when the interfering signal is received.

11. The UE of claim 8, wherein the first mwB receives interference from the at least one other mwB, the UE further comprising:

means for receiving the instruction from the first mwB to transmit the resource allocation information of the first mwB to the at least one other mwB, wherein the resource allocation information of the first mwB is transmitted to the at least one other mwB based on the instruction.

12. The UE of claim 8, further comprising:

means for receiving third information from the at least one other mwB;

means for determining fourth information based on the received third information; and means for transmitting the fourth information to the first mwB.

13. The UE of claim 12, wherein:

the third information comprises timing information of the at least one other mwB; the means for determining the fourth information is configured to measure at least one of: a first timing discrepancy between the timing information of the at least one other mwB and an expected timing information, or a second timing discrepancy between the timing information of the at least one other mwB and timing information of the first mwB; and the means for transmitting the fourth information is configured to transmit the at least one of the measured first timing discrepancy or the measured second timing discrepancy to the first mwB.

14. The UE of claim 12, wherein:

the third information comprises resource allocation information of the at least one other mwB;

the fourth information is determined to be the third information; and the means for transmitting the fourth information is configured to transmit the resource allocation information of the at least one other mwB to the first mwB.

15. A user equipment (UE), comprising:

a memory; and at least one processor coupled to the memory and configured to:

receive first information from a first millimeter-wave base station (mwB), wherein the first information comprises resource allocation information of the first mwB;

determine second information based on the received first information; and transmit the second information to at least one other mwB during discovery of the at least one other mwB, or association with one of a received interfering signal, or a received instruction, with the UE being a relay between the first mwB and the at least one other mwB, wherein the first information and the second information are related to at least one of synchronization or a network state between the first mwB and the at least one other mwB, wherein the second information comprises resource allocation information of the first mwB.

16. The UE of claim 15, wherein:

the first information comprises timing information of the first mwB; the at least one processor determines the second information by measuring at least one of: a first timing discrepancy between the timing information of the first mwB and an expected timing information, or a second timing discrepancy between the timing information of the first mwB and timing information of the at least one other mwB; and the at least one processor transmits the second information by transmitting the at least one of the measured first timing discrepancy or the measured second timing discrepancy to the at least one other mwB.

17. The UE of claim 15, the at least one processor further configured to:

receive the interfering signal from the at least one other mwB, wherein the resource allocation information of the first mwB is transmitted to the at least one other mwB when the interfering signal is received.

18. The UE of claim 15, wherein the first mwB receives interference from the at least one other mwB, the at least one processor further configured to:

receive the instruction from the first mwB to transmit the resource allocation information of the first mwB to the at least one other mwB, wherein the resource allocation information of the first mwB is transmitted to the at least one other mwB based on the instruction.

19. The UE of claim 15, the at least one processor further configured to: receive third information from the at least one other mwB;

determine fourth information based on the received third information; and transmit the fourth information to the first mwB.

20. The UE of claim 19, wherein:

the third information comprises timing information of the at least one other mwB; the at least one processor determines the fourth information by measuring at least one of: a first timing discrepancy between the timing information of the at least one other mwB and an expected timing information, or a second timing discrepancy between the timing information of the at least one other mwB and timing information of the first mwB; and the at least one processor transmits the fourth information by transmitting the at least one of the measured first timing discrepancy or the measured second timing discrepancy to the first mwB.

21. The UE of claim 19, wherein:

the third information comprises resource allocation information of the at least one other mwB;

the fourth information is determined to be the third information; and the at least one processor transmits the fourth information by transmitting the resource allocation information of the at least one other mwB to the first mwB.

22. A non-transitory computer-readable medium storing computer executable code for wireless communication, comprising code to:

receive at a user equipment (UE) first information from a first millimeter-wave base station (mwB), wherein the first information comprises resource allocation information of the first mwB;

determine second information based on the received first information; and transmit from the UE the second information to at least one other mwB during discovery of the at least one other mwB, or in association with one of a received interfering signal, or a received instruction, with the UE being a relay between the first mwB and the at least one other mwB, wherein the first information and the second information are related to at least one of synchronization or a network state between the first mwB and the at least one other mwB, wherein the second information comprises resource allocation information of the first mwB.

* * * * *